(12) United States Patent
D'Angelo et al.

(10) Patent No.: US 8,212,175 B2
(45) Date of Patent: Jul. 3, 2012

(54) METHOD FOR CONTROLLING THE QUALITY OF LASER-WELDING PROCESSES, CONTROL SYSTEM AN PROGRAM PRODUCT THEREFOR

(75) Inventors: Giuseppe D'Angelo, Grugliasco (IT); Giorgio Pasquettaz, Vercelli (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 1135 days.

(21) Appl. No.: 12/064,737

(22) PCT Filed: Sep. 19, 2006

(86) PCT No.: PCT/EP2006/066491
§ 371 (c)(1),
(2), (4) Date: Feb. 25, 2008

(87) PCT Pub. No.: WO2007/039449
PCT Pub. Date: Apr. 12, 2007

(65) Prior Publication Data
US 2008/0245778 A1    Oct. 9, 2008

(30) Foreign Application Priority Data
Sep. 22, 2005  (EP) .................................. 05425662

(51) Int. Cl.
*B23K 26/20*   (2006.01)
*G06F 19/00*   (2011.01)
(52) U.S. Cl. ................................. 219/121.63; 700/166
(58) Field of Classification Search ............ 219/121.63, 219/121.64, 121.83, 121.62; 700/166
See application file for complete search history.

(56) References Cited

U.S. PATENT DOCUMENTS

| | | | |
|---|---|---|---|
| 6,670,574 B1 * | 12/2003 | Bates et al. | 219/121.64 |
| 7,640,125 B2 * | 12/2009 | D'Angelo et al. | 702/81 |
| 2005/0163364 A1 * | 7/2005 | Beck et al. | 382/152 |
| 2005/0205528 A1 * | 9/2005 | D'angelo et al. | 219/121.6 |
| 2006/0074602 A1 * | 4/2006 | D'Angelo et al. | 702/188 |

FOREIGN PATENT DOCUMENTS

| | | |
|---|---|---|
| EP | 1 275 464 | 1/2003 |
| EP | 1 361 015 | 11/2003 |
| EP | 1464435 A1 * | 10/2004 |
| WO | 99/14640 | 3/1999 |

OTHER PUBLICATIONS

International Search Report for PCT/EP2006/066491 mailed Dec. 28, 2006.
Written Opinion of the International Searching Authority mailed Dec. 28, 2006.

* cited by examiner

*Primary Examiner* — Geoffrey S Evans
(74) *Attorney, Agent, or Firm* — Nixon & Vanderhye P.C.

(57) ABSTRACT

Described herein is a method for controlling the quality of a laser-welding process, for example of laser welds of semifinished products constituted by elements of sheet metal of different thickness and/or properties ("tailored blanks"), of the type that comprises the steps of: detecting a radiation (E*) produced in the welding area (2, 3) and issuing signals (E*) indicating said radiation; acquiring and processing said signals (E*) indicating said radiation; making a division into blocks of said signals (E*) indicating said radiation; calculating (205) for each block a block-mean value (u) and a value of block standard deviation (o); and in supplying input values comprising block-mean values (u) and values standard deviation (o) for identifying defects and/or porosities and insufficient penetration.

12 Claims, 10 Drawing Sheets

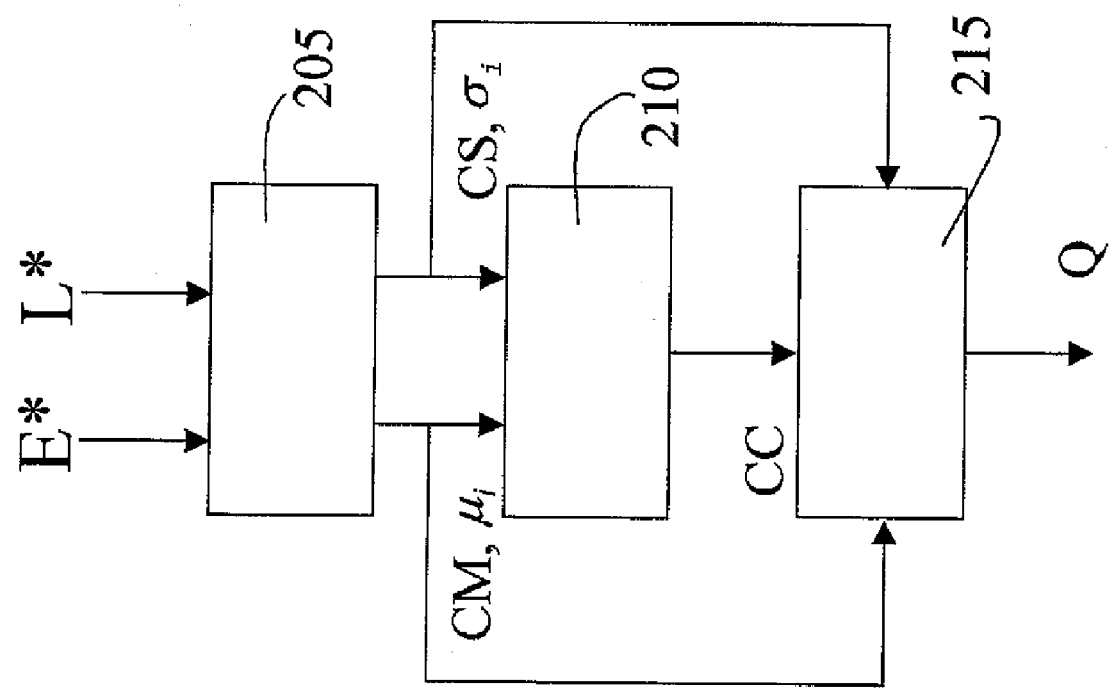

METHOD FOR CONTROLLING THE QUALITY OF LASER-WELDING PROCESSES, CONTROL SYSTEM AN PROGRAM PRODUCT THEREFOR

This application is the U.S. national phase of International Application No. PCT/EP2006/066491, filed 19 Sep. 2006, which designated the U.S. and claims priority to EP 05425662.3, filed 22 Sep. 2005, the entire contents of each of which are hereby incorporated by reference.

The present invention relates to a method for controlling the quality of a laser-welding process, which comprises the steps of:

detecting a radiation produced in the welding area and issuing signals indicating said radiation;

acquiring and processing said signals indicating said radiation;

making a division into blocks of said signals indicating said radiation;

calculating for each block a block-mean value and comparing each of said block-mean values with a value that is a function of the mean of the acquired signal indicating the radiation, identifying blocks characteristic for the mean on the basis of said operation of comparison; and calculating for each block a value of block standard deviation and comparing each of said values of block standard deviation with a value that is a function of a reference standard deviation, identifying blocks characteristic for the standard deviation on the basis of said operation of comparison.

The monitoring of the defects in industrial processes assumes increasing economic importance on account of its impact in the analysis of quality of industrial products. The possibility of obtaining an evaluation of the quality of the industrial process on line and in an automatic way presents many advantages both of an economic nature and in terms of processing speeds. The desirable characteristics of the system are consequently:

on-line and real-time processing; and capacity for accurate recognition of the main production defects.

Currently, the problem of recognition of the quality of an industrial process, and consequently identification of the defects, is obtained through an off-line inspection by specialized staff, or else with automatic methods which, through sensors, identify only some of the defects listed above, in a way that is unsatisfactory and moreover sensitive to the different settings of the machine.

Methods and systems are known for controlling quality in industrial processes, for example applied to on-line monitoring of the laser-welding process, in particular in the case of welding of metal sheets. The control system is able to evaluate the presence of porosities in the welding area or else, in the case of butt-welded thin metal sheets, the presence of defects due to overlapping or to the disjointing of the metal sheets.

Said currently used systems base quality control upon a comparison between the signals detected during the process and one or more predetermined reference signals indicating a good-quality weld. Said reference signals, usually ranging in number between two and ten, are pre-established starting from a number of good-quality weld specimens. Obviously, said mode of proceeding implies the presence of a skilled operator capable of certifying the goodness of the weld at the moment of creation of the reference signals, involves expenditure in terms of time and sometimes also waste of material (i.e., material that is wasted for making the specimens necessary for obtaining the reference signals). In some cases, also reference signals are established that indicate a weld with defects, which entails additional problems and difficulties.

From the European patent application No. EP-A-1275464, filed in the name of the present applicant, it is known to divide into blocks the signal acquired via a photodiode that collects the radiation emitted by a welding spot, calculate the mean of the signal in each block sampled, and consider the blocks that have a value lower than or equal to the offset of the photodiode that indicate the presence of a defect. Said method eliminates the need for the reference; however, it enables only a very approximate detection of the defects.

The purpose of the present invention is to overcome all the aforesaid drawbacks.

With a view to achieving said purpose, the subject of the invention is a method for controlling the quality of industrial processes having the characteristics indicated at the beginning of this description and characterized moreover in that it comprises a procedure of classification of the quality of a parametric type that envisages supplying a plurality of input values, said procedure comprising the operations of:

supplying input values for identifying defects and/or porosities by means of quantities corresponding to said blocks characteristic for the mean; and supplying input values for identifying insufficient penetration by means of quantities corresponding to said blocks characteristic for the standard deviation.

Of course, a further purpose of the invention is the system for controlling the quality of industrial processes that implements the method described above, as well as the corresponding computer-program product that can be loaded directly into the memory of a computer such as a processor and comprises software code portions for performing the method according to the invention when the product is run on a computer.

Further characteristics and advantages of the invention will emerge from the ensuing description with reference to the annexed drawings, which are provided purely by way of non-limiting example and in which:

FIG. 10 shows a block diagram representing the method according to the invention.

Figure 1:
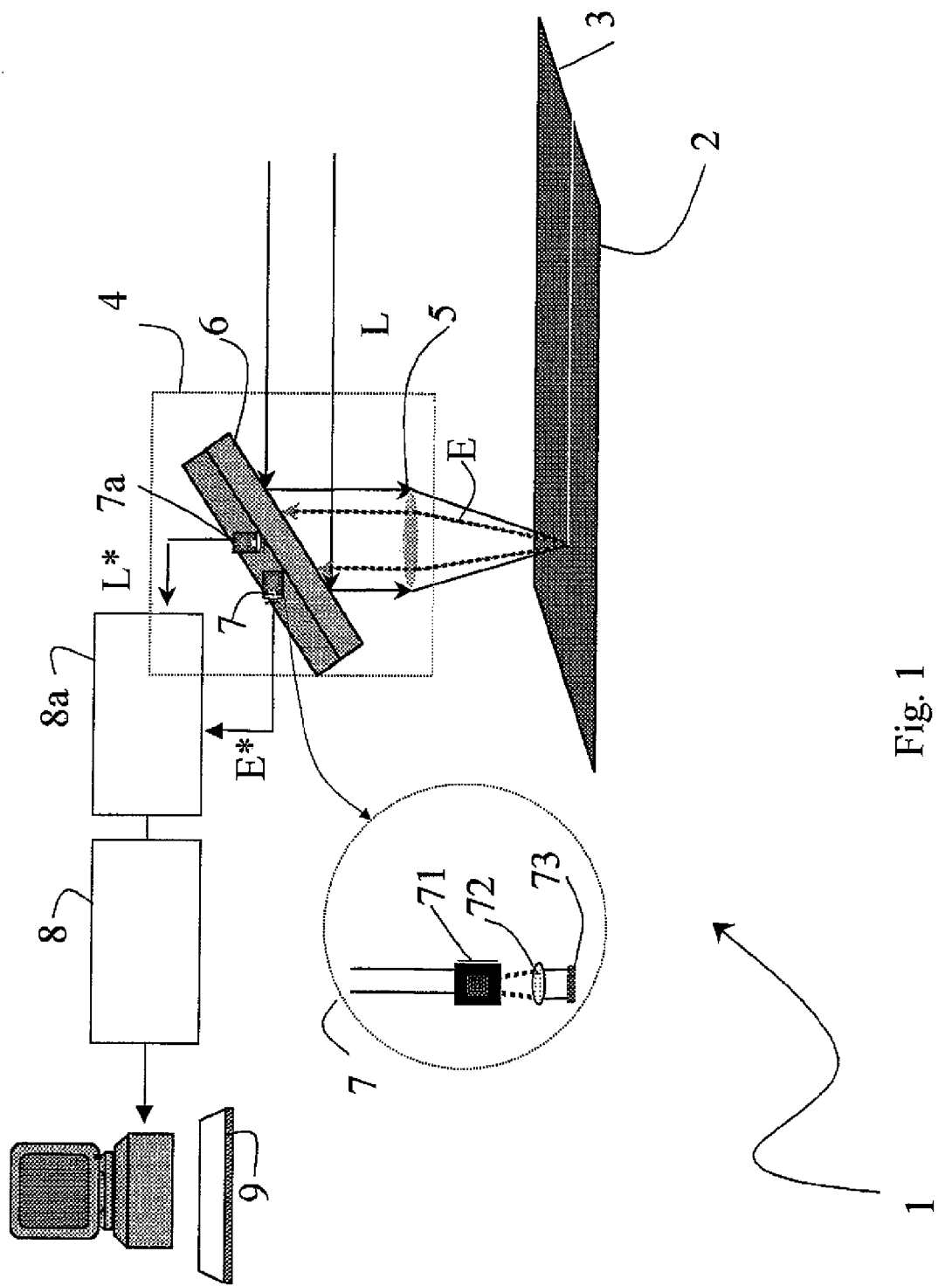
FIG. 1 is a block diagram representing a system implementing the method according to the invention.

With reference to FIG. 1, the number 1 designates as a whole a system for controlling the quality of a laser-welding process. The example regards the case of two metal sheets 2, 3 that are welded using a laser beam L. The reference number 4 indicates as a whole the focusing head, including a lens 5, which is reached by the laser beam L originating from a laser generator (not illustrated) and reflected by a half-silvered mirror 6. The radiation E emitted by the welding area passes through the half-silvered mirror 6 and is picked up by a first sensor 7 constituted, as may be seen from the magnified detail illustrated in FIG. 1, by a photodiode 71 associated to a focusing lens 72 and to an optical filter 73, preferably an interference filter operating in the visible between 300 and 600 nm and capable of sending an output signal thereof, corresponding to a signal indicating the process radiation E*, i.e., a signal that contains spectral and temporal characteristics of the radiation reflected at the welding point, to a lowpass filter 8a and to an analog-to-digital converter 8, which samples the filtered signal and converts it numerically to supply it to a personal computer 9, which is equipped with an acquisition card (not illustrated in the figures). The acquisition card is, by way of example, a data-acquisition card of the type PC card NI 6110E, with a maximum acquisition rate of 5 Ms/sec.

The power of the laser beam L is also detected by a second sensor 7a, with a photodiode structure substantially similar to that of the first sensor 7, said second sensor 7a supplying at output a signal indicating the laser power L*.

In a concrete embodiment, the half-silvered mirror 6 used is a ZnSe mirror, having a diameter of 2 ins and a thickness of 5 mm. The sensors 7 and 7a comprise a photodiode with spectral response of between 190 and 1100 nm, an active area of 1.1×1.1 mm, and a quartz window.

The personal computer 9 receives, via the converter 8, the levels of the signal corresponding to a certain optical frequency and analyses in real time the flow of data by means of a dedicated software.

Substantially, the method for controlling the quality of a laser-welding process is based upon the observation of the common characteristics of the signals originated by the first sensor 7 for detecting the reflected radiation E and by the second sensor 7a for detecting the incident laser radiation L. It is thus possible to identify two types of abnormal behaviour of the signal, which correspond to two classes of bad welds, namely, defects and porosities.

The defects are characterized by a drop within a short time both of the mean and of the standard deviation of the signal indicating the process radiation E*, whilst the porosities have the same characteristics of mean and standard deviation of the signal, but said characteristics last for a longer time and with a larger amplitude. Another class of defect of interest is the lack of penetration. The main difference between a good weld and one with defective penetration is noted from a drop of long duration in the standard deviation of the signal indicating the process radiation E*.

The method and system proposed have been developed on the basis of said simple observations corresponding to the classes of defectiveness and basically envisage the following steps or procedures, illustrated in the block diagram of FIG. 10:

a procedure 205 of extraction of the characteristic: this is constituted by the part of signal processing for obtaining two different types of characteristics, namely characteristics of standard deviation CS and characteristics of mean value CM;

a procedure 210 of combination of the characteristic: the main operation of said procedure envisages merging the characteristics of standard deviation CS and the characteristics of mean value CM in predetermined conditions for identifying combined characteristics CC;

a procedure 215 of classification of the characteristic: this classifies the combined characteristic CC obtained via the procedure of combination of the characteristic for deciding whether the signal corresponds to a good weld or a bad weld, that is supplying at output a signal indicating the quality Q.

The procedure 205 of extraction of the characteristic constitutes a part of primary importance for the efficient operation of the entire method of control of the quality of laser welds, because an accurate identification of the characteristics constitutes the basis for a good classification. Said procedure 205, as has been said, comprises two different operations for extracting two different types of characteristics. In a first operation, characteristics for the mean value CM are extracted.

For this purpose, once a division has been made into temporal blocks of the signal indicating the radiation E*, in a first step a mean of the blocks of the signals is calculated. The format of the block is arbitrary but fixed, and if possible the blocks do not overlap. Then, this mean of the block is compared to the mean of the entire signal E*. The foregoing can be expressed by the following relation:

$$CM = \text{find}_{i=1:end}(\mu_i \leq \mu - k\sigma) \quad (1)$$

where $\mu$ indicates the mean of the signal E*, $\mu_i$ the mean of the block of index i, $\sigma$ the standard deviation of the signal E*, k a positive adjustment constant. Relation (1) appearing above represents the search for the block, indicated as characteristic of mean value CM, between the blocks of index i from 1 to end, where end indicates the index of the last block acquired, in which the mean of the block $\mu_i$ is smaller by k times the mean value $\mu$ of the signal minus the standard deviation of the signal $\sigma$. Contiguous blocks that satisfy the condition of search expressed in relation (1) are connected together to obtain the mean characteristics. To give more stability to the process of connection and to obtain the best characteristics, two blocks are connected together also in the cases where the distance between them is smaller than five blocks.

Figure 2:
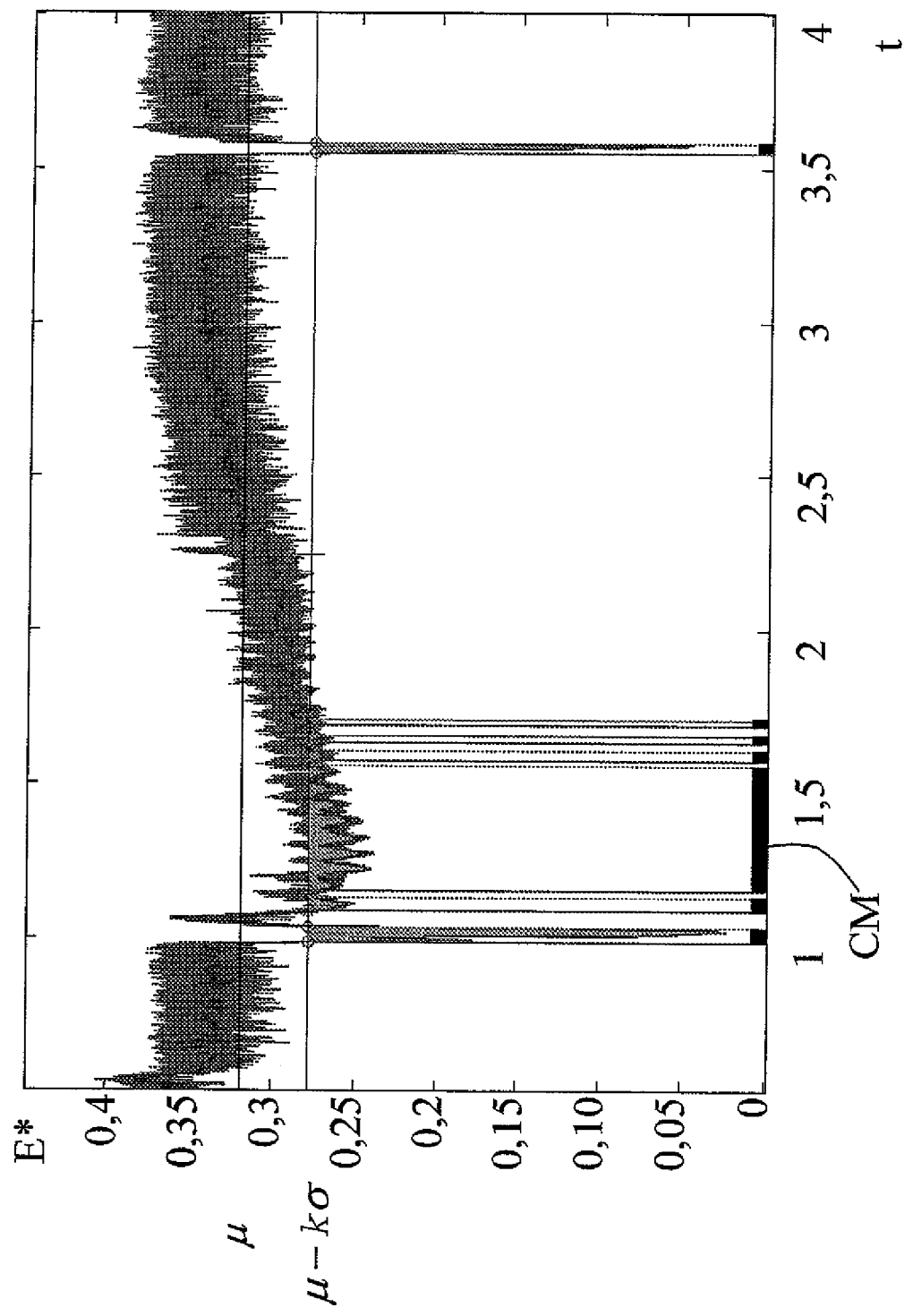
FIGS. 2, 3, 4 show diagrams for a procedure of extraction of characteristics from a signal taken from the system of FIG. 1.

Illustrated as a function of time t in FIG. 2 is the signal indicating the process radiation E*, extracted from the welding process, the mean value $\mu$ of said signal E*, the block-mean values $\mu_i$, whilst indicated by two horizontal straight lines are the values corresponding to the mean value $\mu$ and the limit value $\mu - k\sigma$. The blocks that satisfy the condition of search expressed in relation (1) are indicated as characteristics of mean value CM and highlighted by black bands in the diagram.

The procedure to obtain the characteristics of standard deviation CS is quite similar to the one described previously for the characteristics corresponding to the mean value CM. The main difference is that here a parameter from a reference signal is required; said parameter is the standard deviation of the entire reference signal $\sigma_{reference}$.

In the first place, a standard deviation of the block $\sigma_i$ is calculated, and then the blocks are joined and the intensity is calculated. To identify the defective blocks CS the following relation is used:

$$CS = \text{find}_{i=1:end}(\sigma_i \leq \sigma_{reference} * tl) \quad (2)$$

Designated by tl is a tolerance, i.e., a parameter that takes into account the good quality of the reference signal: the better the reference signal, the closer it is to the tolerance value tl.

Relation (2) appearing above illustrates the search for the block CS, referred to as block characteristic for the standard deviation CS, between the blocks of index i, ranging from 1 to end, where end designates the index of the last block acquired, in which the standard deviation of the block $\sigma_i$ is smaller than or equal to tl times the standard deviation of the entire reference signal $\sigma_{reference}$.

Figure 3:
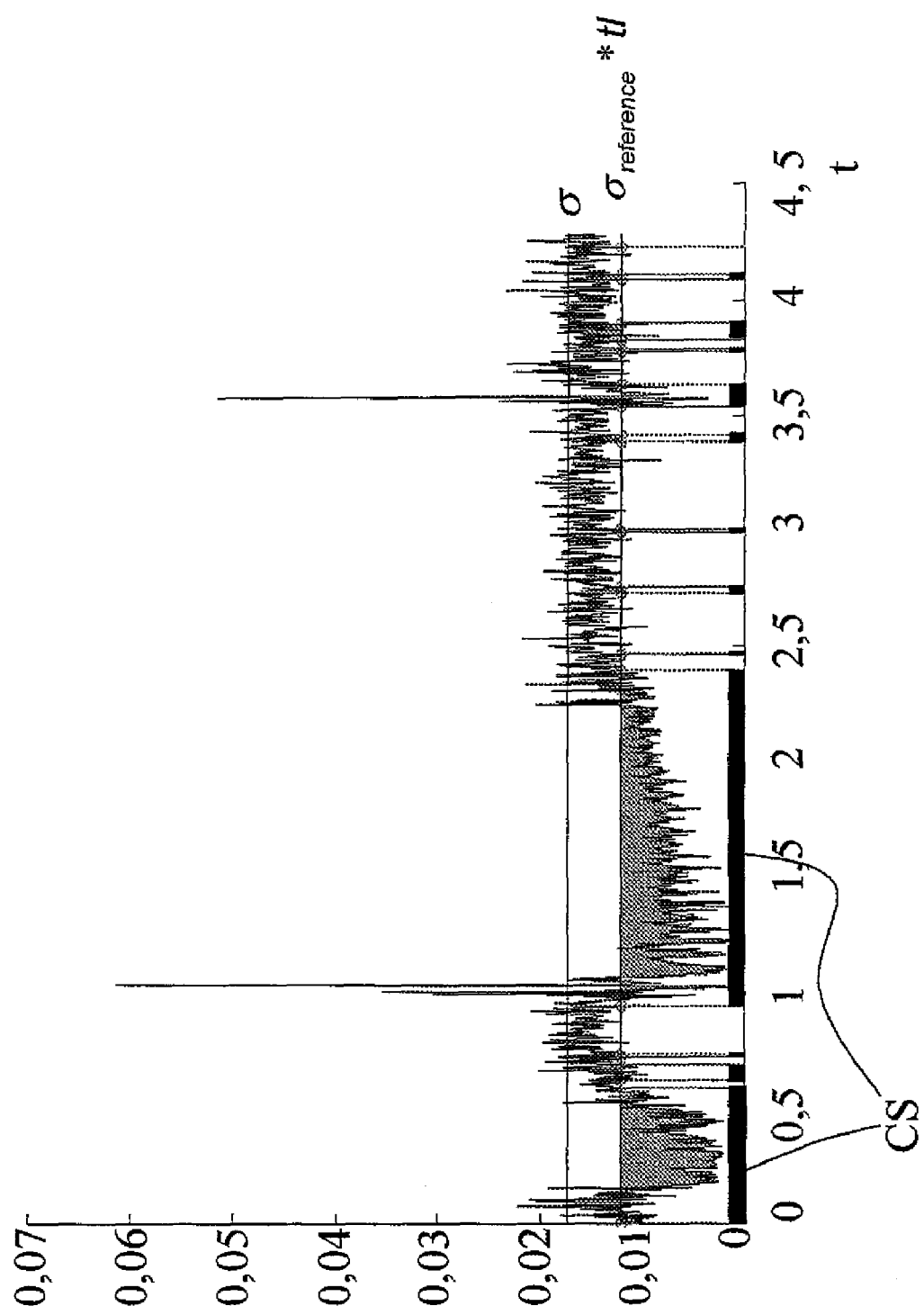

Illustrated in FIG. 3 is the result of the extraction of the characteristic of standard deviation CS, which is substantially analogous the operation of extraction of the characteristic of mean value CM.

The procedure of combination of the characteristics envisages considering characteristics of mean value CM and standard deviation CS, combining them, and identifying a combined characteristic CC, which is used during classification for recognizing defects and porosities. In particular, a new combined characteristic CC is constituted only if a characteristic of mean CM is temporally superimposed upon a characteristic of standard deviation CS. If a characteristic of mean CM is superimposed upon two characteristics of standard deviation CS, the association is made with the one between the two characteristics of standard deviation CS that has the higher intensity, i.e., is distinguished by higher values of standard deviation of the block $\sigma_i$. The meaning of said operation of combination is that both the defects and the porosities show their presence with a drop in both of the parameters, namely mean and standard deviation of the signal acquired by the process. To identify the lack of penetration, only the characteristics of standard deviation CS are used, calculated as described with reference to the procedure of extraction of the characteristics and to FIG. 3.

Figure 4:
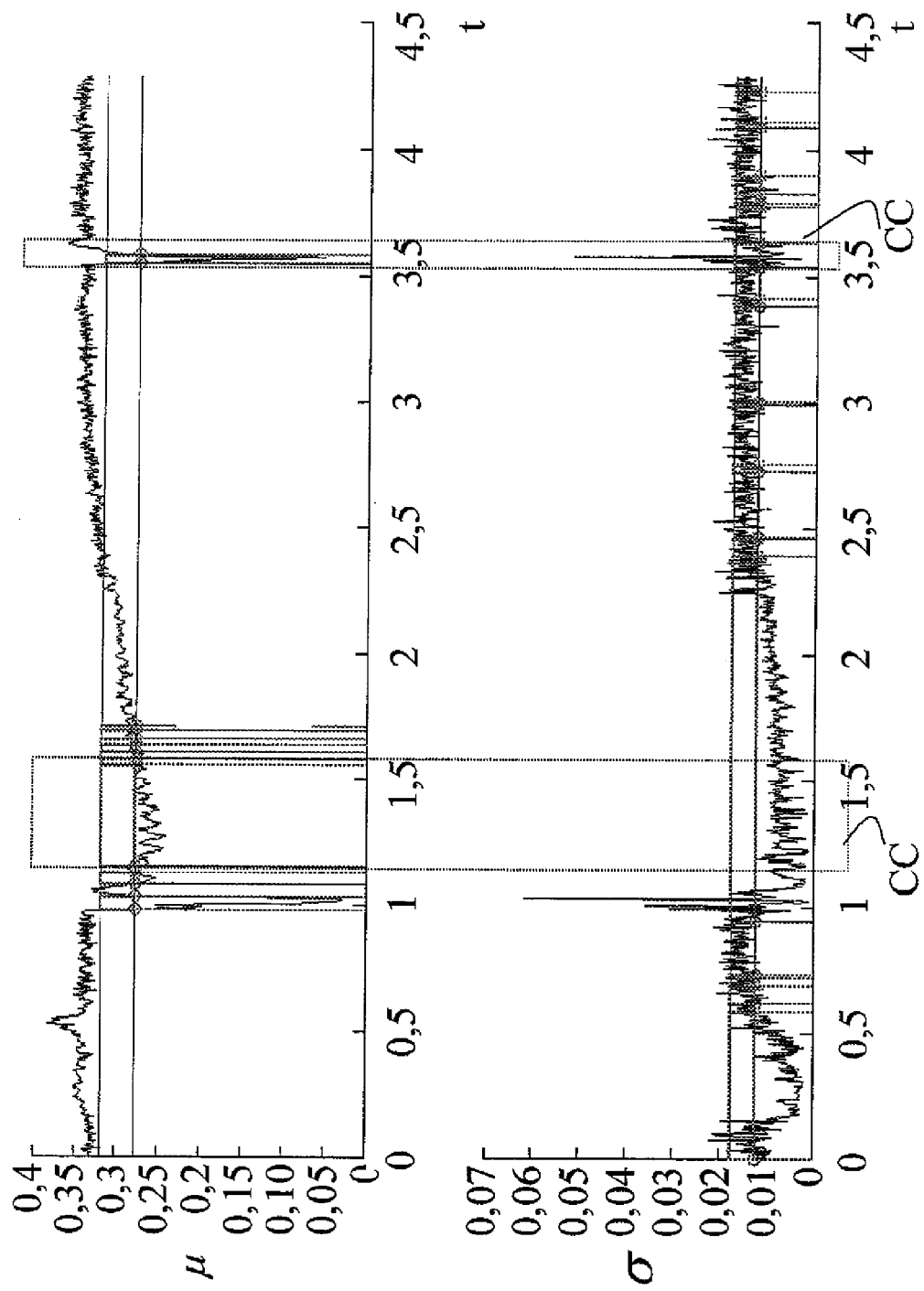

The result of this process is indicated in FIG. 4, which is a diagram that shows, as a function of time t, on the top axis, the mean value $\mu$ of the signal indicating the process radiation E* and, on the bottom axis, the standard deviation $\sigma$ of the signal indicating the process radiation E*. Indicated by rectangles in FIG. 4 are the characteristics of mean value CM and standard deviation CS important for generating the combined characteristics CC.

The procedure of classification 215 has the ultimate function of discriminating between good welds and bad welds and supplying a classification of output for the welded segment. The procedure of classification comprises two steps: a first step of search for defects and porosities using the combined characteristics CC selected in the way described previously, and a second step of search for lack of penetration using the characteristics of standard deviation.

The procedure of classification envisages using a three-dimensional space, appearing, respectively, on the axes of which are the intensity of mean value, i.e., the block-mean values, $\mu_i$, the intensity of standard deviation, i.e., the values of block standard deviation, $\sigma_i$ and a temporal length FL of the combined characteristic CC identified. The classifier considered is parametric and the corresponding freedom degrees are then trained on the basis of a set of (input, output) samples. In this case, the inputs refer to the characteristics CC acquired, and the output supplied is the quality of the weld as assigned by an operator after investigation on the welded segment. The present classifier, as compared to the wide range of classifiers known in the literature, is of a particularly compact and efficient type to guarantee both the exactness of the performance and a low computational load, conditions that render a rigorous real-time execution in industrial processes feasible. The classifier used in the preferred embodiment is based upon a feedforward neural network, where the topology, the number of levels, and the neurons are arbitrary but fixed during the step of learning of the parameters and that of operation.

Illustrated in the ensuing FIGS. 5 to 9 is said three-dimensional representation in terms of characteristics extracted from the signal indicating the process radiation E* in different situations of the welding process. The procedure of classification envisages, in a first operation, developing boundaries of separation between the classes corresponding to the quality of the weld that are as good as possible, which is an operation that will enable, during operation of the welding machine, classification of the quality of the segment of weld in process via an analysis of the information received of the characteristics of mean and standard deviation.

Figure 5:
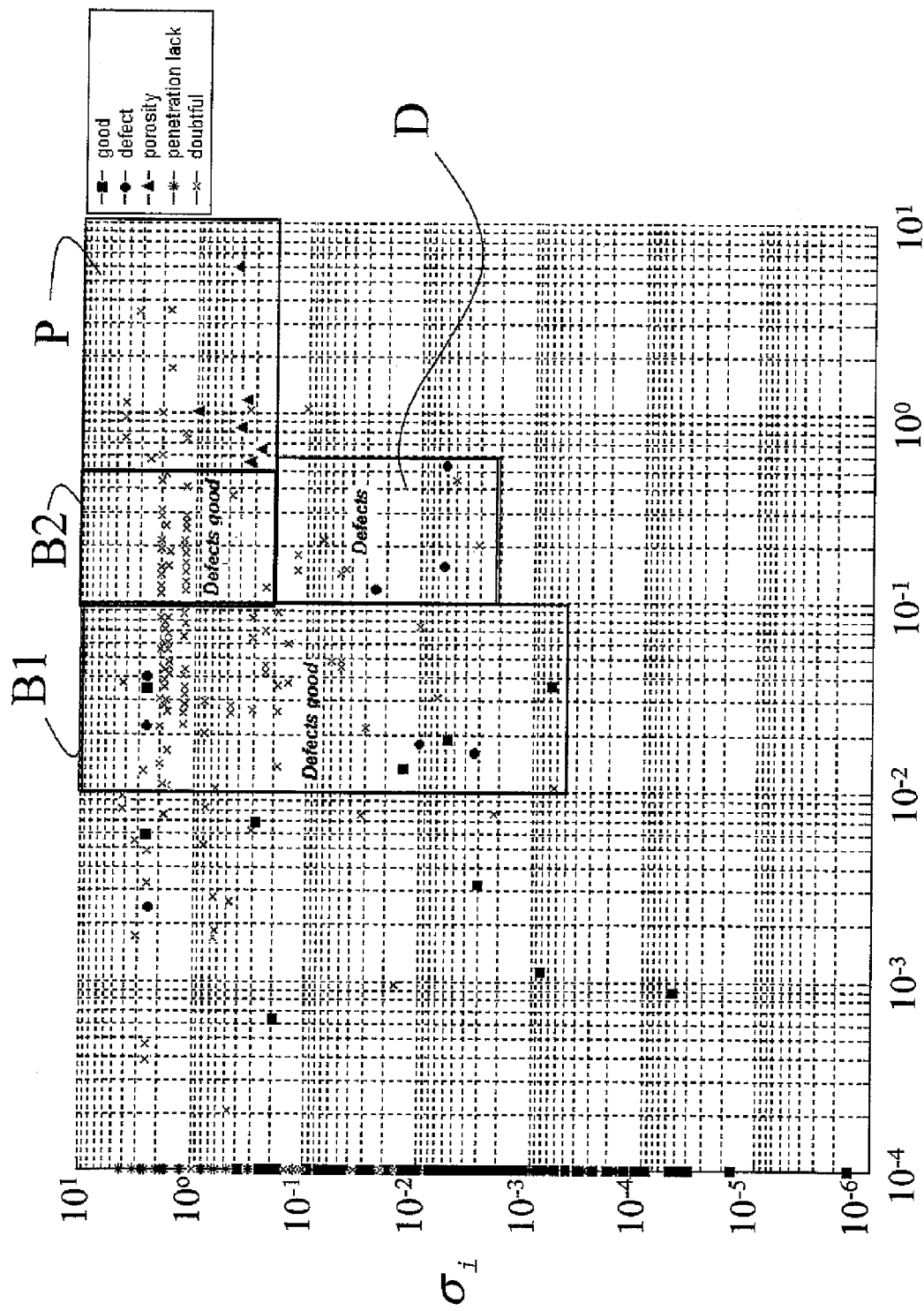
FIG. 5 illustrates a map of characteristics extracted via the procedure of extraction exemplified in FIGS. 2, 3 and 4.

The three-dimensional map will now be illustrated, for reasons of clarity, by two two-dimensional diagrams equivalent to the three-dimensional map, which is, instead, more difficult to represent herein. In FIG. 5, there is therefore illustrated a first two-dimensional diagram, which gives, on the abscissa, the intensities of mean value $\mu_i$ and, on the ordinate, the intensities of standard deviation $\sigma_i$. The classes of quality of the weld are indicated with the following symbols:

squares for good welds;
circles for defective welds;
triangles for porous welds;
asterisks for welds with lack of penetration;
"x" for doubtful classification.

It may be appreciated how, from an examination of said three-dimensional representation, there are identified in quite a well-defined way, in the region distinguished by higher values of intensity of mean $\mu_i$ and standard deviation $\sigma_i$, four areas: a first area B1 that contains values of defective welds and good welds; an area D that contains values of defective welds; a second area B2 that contains values of good welds and defective welds; and an area P for values of porous welds. Each of these areas contains also cases of doubtful classification.

Figure 6:
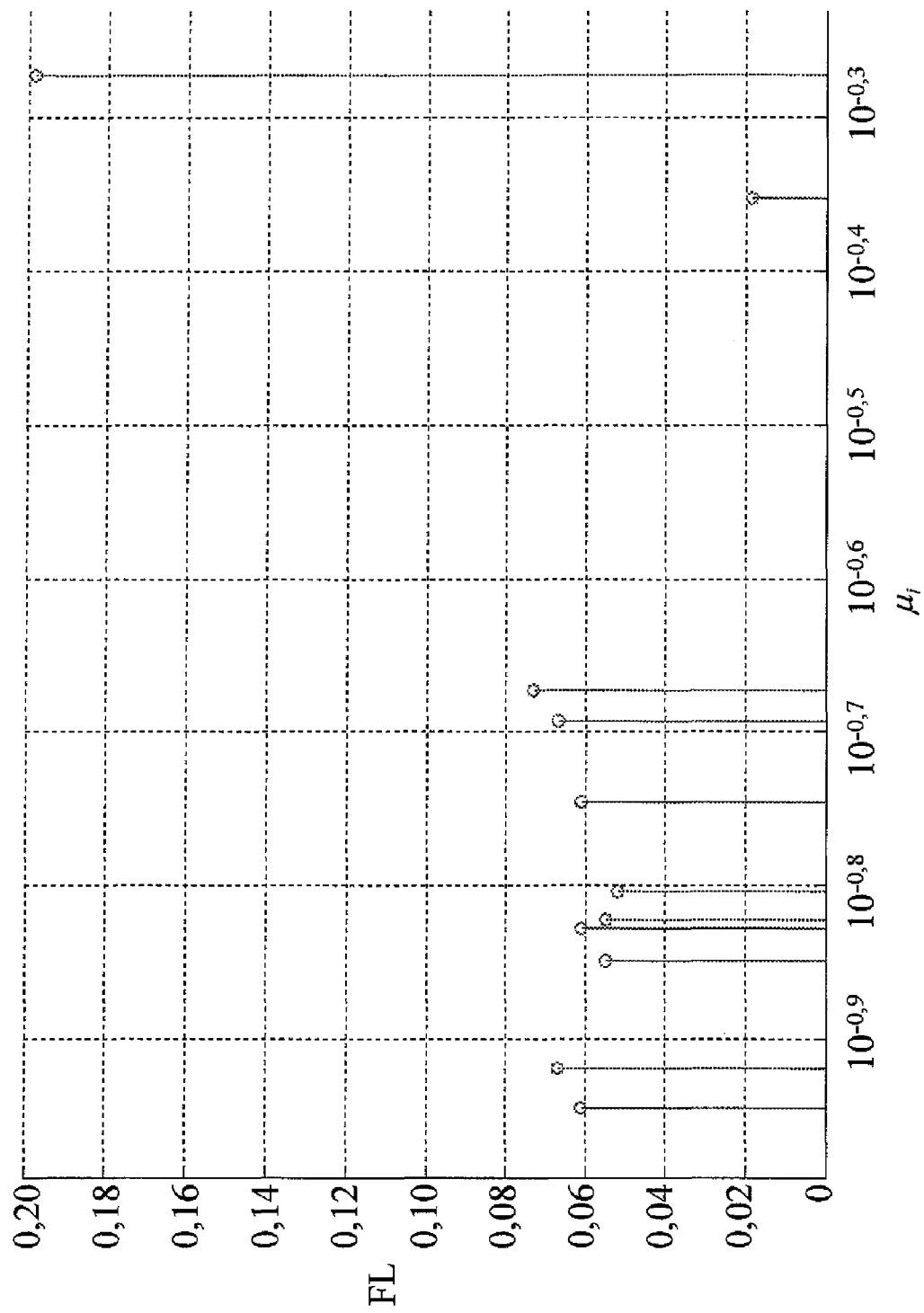
FIGS. 6, 7, 8 and 9 illustrate diagrams for the classification of welds according to the method of the invention.

Illustrated in the diagram of FIG. 6 is the third dimension for the temporal length FL. In particular, analysed in greater detail in FIG. 6 is the area D that contains defective welds, where the temporal length FL of the characteristic is represented as a function of the intensity of the mean $\mu_i$. As may be noted, all the doubtful characteristics contained in said area D can be classified as defects because the temporal length FL of the signal is similar to that of the defects. It may therefore be asserted that this is an defective area.

Figure 7:
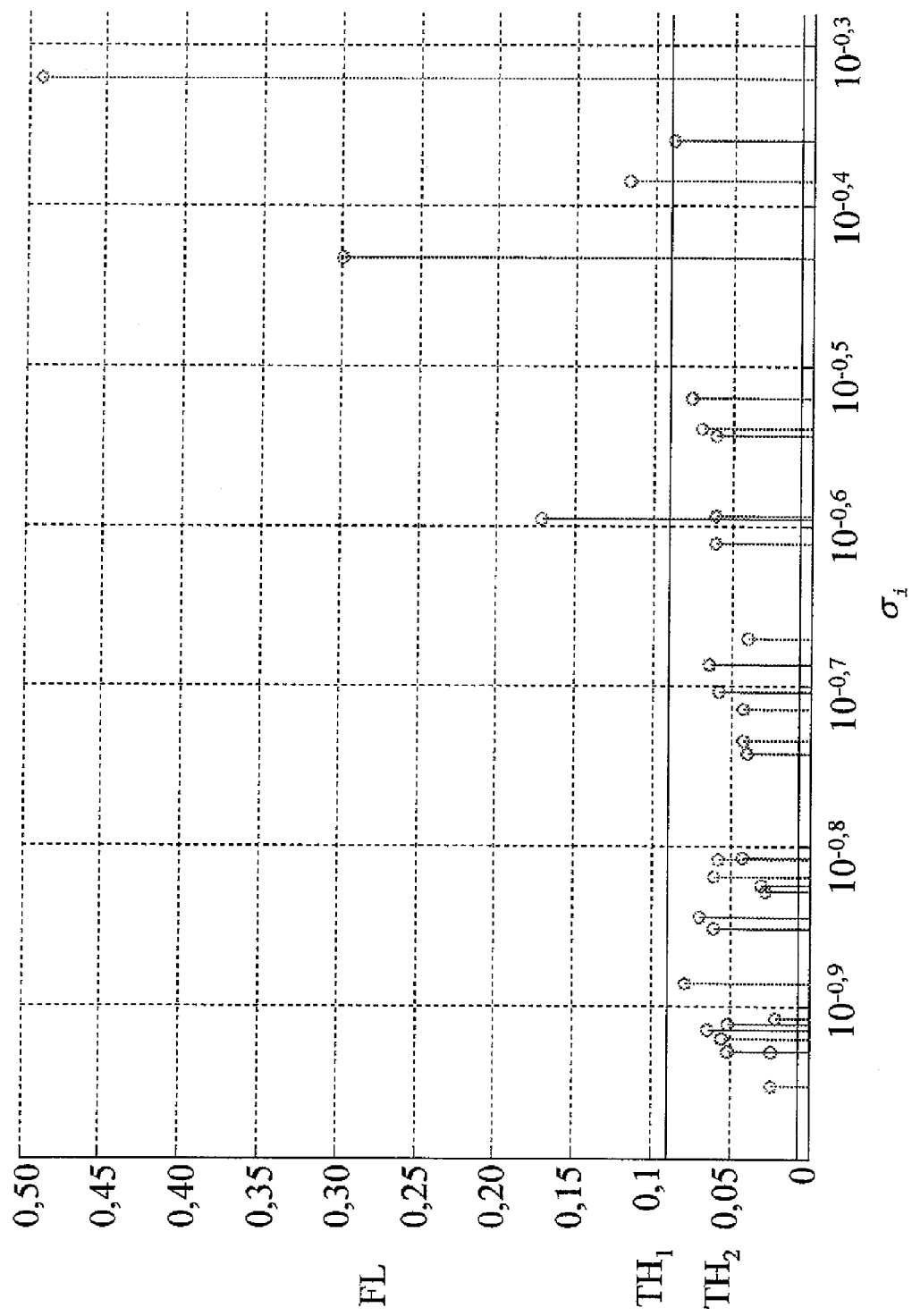

The first area B1 that contains both defective welds and good welds is analysed in the analogous diagram of FIG. 7, where it may be noted that the defects are located between a lower threshold $TH_1$ and an upper threshold $TH_2$ of temporal length, whilst outside this area all the characteristics can be considered as corresponding to good welds. This means that when the intensity of mean $\mu_i$ is distributed in a time that is excessively long or is excessively short, the characteristic cannot correspond to a defect. Taking into consideration the upper part of the region B1 for values of standard deviation between 1 and 10, there is in fact also found a defect with a temporal length of 0.06, which is thus classified as good. This, on the other hand, does not constitute a drawback, because, as illustrated hereinafter, the procedure of classification identifies said characteristic as lack of penetration. Similar arguments may be applied to the second area B2 that contains both defective welds and good welds.

Figure 8:
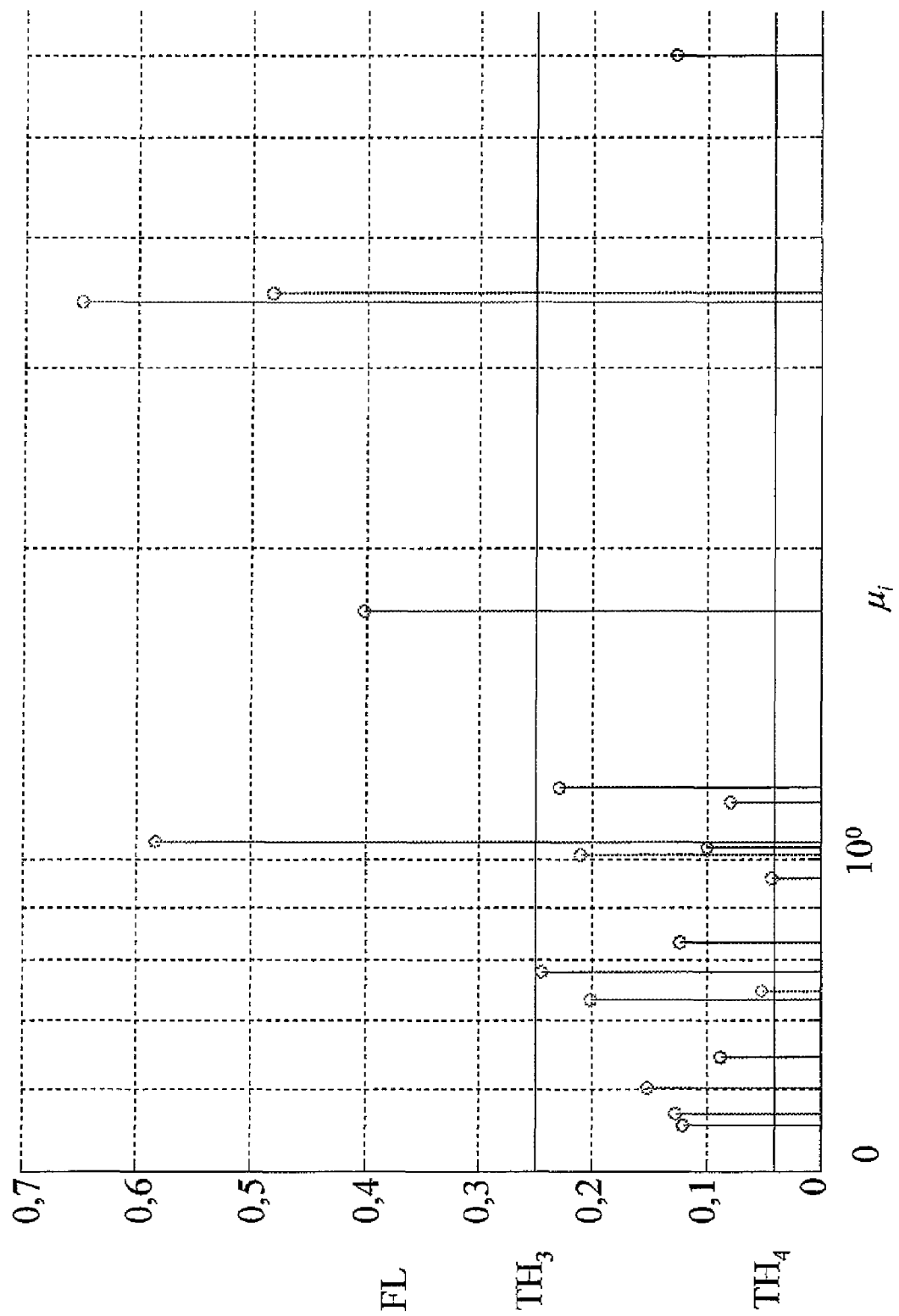

As regards the area P of porosities, which relates to FIG. 8, in effect also said area P of porosities contains a mixture of good welds and porous welds. Also in this case there is defined a lower threshold $TH_3$ and an upper threshold $TH_4$ of temporal length. Characteristics with a temporal length that falls within said thresholds $TH_3$ and $TH_4$ are classified as porous.

Figure 9:
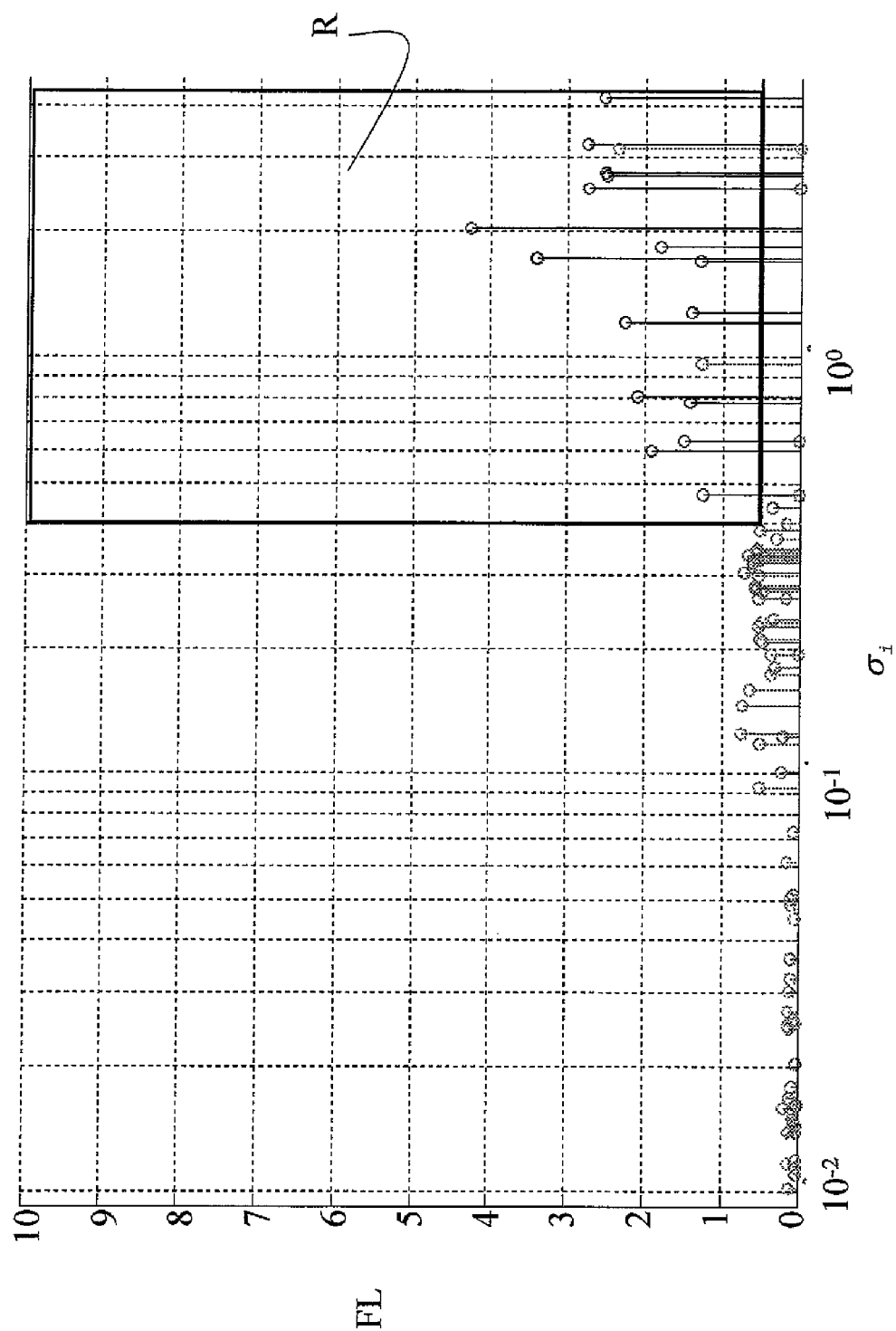

To estimate the lack of penetration an evaluation is made, as illustrated in FIG. 9, of the intensity of standard deviation $\sigma_i$ as a function of the temporal length FL.

In the diagram of FIG. 5, the symbols 'x' for lack of penetration are all on the upper part of the axis of the ordinate, but only to render it visible in the range of said complex diagram. In general, the modulus of the intensity of mean value $\mu_i$ is not important for the evaluations of lack of penetration. As may be seen in FIG. 9, identified within a rectangle R that corresponds to points above certain given values of intensity of standard deviation $\sigma_i$ and temporal length FL are characteristics indicating lack of penetration.

Of course, without prejudice to the principle of the invention, the details of implementation and the embodiments may vary widely with respect to what is described and illustrated herein purely by way of example, without thereby departing from the scope of the present invention.

The invention claimed is:

1. A computer-program that can be loaded directly into the memory of a computer and comprises portions of software code for implementing a method for controlling the quality of a laser-welding process of laser welds of semifinished products constituted by elements of sheet metal of different thickness and/or properties, said method comprising the steps of:

detecting a radiation produced in the welding area and issuing signals indicating said radiation, acquiring and processing said signals indicating said radiation, making a division into temporal blocks of said signals indicating said radiation, calculating for each block a block-mean value and comparing each of said block-mean values with a value that is a function of the mean of the acquired signal indicating the radiation, identifying blocks characteristic for the mean on the basis of said operation of comparison, and calculating for each block a value of block standard deviation and comparing each of said values of block standard deviation with a value that is a function of a reference standard deviation, identifying blocks characteristic for the standard deviation on the basis of said operation of comparison, wherein the method comprises a procedure of classification of the quality of a parametric type that envisages supplying a plurality of input values, said procedure comprising the operations of:

supplying input values comprising values of block mean and values of block standard deviation corresponding to said blocks characteristic for the mean for identifying defects and/or porosities; and supplying input values comprising values of block standard deviation corresponding to said blocks characteristic for the standard deviation for identifying insufficient penetration, wherein, prior to said procedure of classification, the method comprises an operation of selecting characteristic blocks for the mean corresponding to characteristic blocks for the standard deviation as combined-characteristic blocks, and wherein the method envisages arranging said block-mean values and values of block standard deviation as respective dimensions in a map with at least three dimensions that comprises, as a third dimension, a block temporal length, when the computer-program is run on the computer.

2. A system for controlling the quality of a laser-welding process, comprising:

sensor means for detecting one or more process parameters, wherein said sensor means issues signals and an electronic control and processing unit for processing the signals issued by said sensor means, wherein said electronic control and processing unit for processing the signals issued by said sensor means is capable of implementing a method for controlling the quality of a laser-welding process of laser welds of semi-finished products constituted by elements of sheet metal of different thickness and/or properties, said method comprising the steps of:

detecting a radiation produced in the welding area and issuing signals indicating said radiation, acquiring and processing said signals indicating said radiation, making a division into temporal blocks of said signals indicating said radiation, calculating for each block a block-mean value and comparing each of said block-mean values with a value that is a function of the mean of the acquired signal indicating the radiation, identifying blocks characteristic for the mean on the basis of said operation of comparison, and calculating for each block a value of block standard deviation and comparing each of said values of block standard deviation with a value that is a function of a reference standard deviation, identifying blocks characteristic for the standard deviation on the basis of said operation of comparison, wherein the method comprises a procedure of classification of the quality of a parametric type that envisages supplying a plurality of input values, said procedure comprising the operations of:

supplying input values comprising values of block mean and values of block standard deviation corresponding to said blocks characteristic for the mean for identifying defects and/or porosities; and supplying input values comprising values of block standard deviation corresponding to said blocks characteristic for the standard deviation for identifying insufficient penetration, wherein, prior to said procedure of classification, the method comprises an operation of selecting characteristic blocks for the mean corresponding to characteristic blocks for the standard deviation as combined-characteristic blocks, and wherein the method envisages arranging said block-mean values and values of block standard deviation as respective dimensions in a map with at least three dimensions that comprises, as a third dimension, a block temporal length.

3. The system according to claim 2, wherein one or more of said sensor means comprise filters configured for working in the spectrum between 300 and 600 nm.

4. The system according to claim 2, wherein the method comprises the operation of defining, in said map with at least three dimensions, boundaries of separation between classes of quality of the weld for said block-mean values and intensity of standard deviation.

5. The system according to claim 4, wherein the method comprises the operation of defining, in said three-dimensional map, thresholds of temporal length of the characteristics and of evaluating said block-mean values with respect to said thresholds for estimating defects and/or porosities of the weld.

6. The system according to claim 2, wherein, for estimating the lack of penetration, the method comprises evaluating said values of block standard deviation as a function of the temporal length.

7. The system according to claim 6, wherein, for estimating the lack of penetration, a rectangle is identified in said map that corresponds to points above certain given values of block standard deviation and temporal length.

8. The system according to claim 2, wherein said operation of calculating, for each block, a block-mean value and comparing each of said block-mean values with a value that is a function of the mean of the acquired signal indicating the radiation, identifying blocks characteristic for the mean on the basis of said operation of comparison comprises seeking the block characteristic for the mean in which the mean of the block is smaller than or equal to k times the mean value of the signal minus the standard deviation of the signal, where k is a positive adjustment constant.

9. The system according to claim 8, wherein said operation of calculating for each block a value of block standard deviation and comparing each of said values of block standard deviation with a value that is a function of a reference standard deviation, identifying blocks characteristic for the standard deviation on the basis of said operation of comparison, comprises the operation of seeking the block in which the standard deviation of the block is smaller than or equal to tl times the standard deviation of the entire reference signal, where tl indicates a tolerance that takes into account the good quality of the reference signal.

10. The system according to claim 8, wherein, during the operation of connection, there is also calculated said intensity of the mean corresponding to the area of the signal in the area included between the mean of the block and the value that is a function of the mean of the acquired signal indicating the radiation.

11. The system according to claim 8, wherein the method comprises the operation of connecting contiguous blocks that satisfy the condition of search to obtain the characteristics of mean and standard deviation.

12. The system according to claim 11, wherein two blocks are connected together also in the cases where the distance between the two blocks is less than five blocks.

* * * * *